United States Patent [19]
Laerdal

[11] 3,736,362
[45] May 29, 1973

[54] APPARATUS FOR PRACTISING RESUSCITATION BY INSUFFLATION AND EXTERNAL HEART MASSAGE

[76] Inventor: Asmund S. Laerdal, Stavanger, Norway

[22] Filed: Dec. 4, 1970

[21] Appl. No.: 95,078

[30]     Foreign Application Priority Data
　　　Dec. 11, 1969　Germany.....................P 19 62 083.8

[52] U.S. Cl.....................................................35/17
[51] Int. Cl.............................................G09b 23/32
[58] Field of Search..........................................35/17

[56]            References Cited
            UNITED STATES PATENTS 2,054,996   9/1936   Upson ..................................35/17 X
3,010,223   11/1961  Alderson...............................35/17
3,049,811   8/1962   Ruben....................................35/17
3,276,147   10/1966  Padellford.............................35/17
3,562,924   2/1971   Baermann..............................35/17
3,562,925   2/1971   Baermann..............................35/17
3,568,333   3/1971   Clark......................................35/17

*Primary Examiner*—Harland S. Skogquist
*Attorney*—Mason, Fenwick & Lawrence

[57]              ABSTRACT

A practising apparatus for a training of resuscitation by synchronized insufflation and external heart massage in which a dummy torso is provided with an imitation thorax and imitation lungs. Writing means associated with said imitation thorax and lungs records on an advanceable record sheet the movements of the lungs and thorax in insufflation and heart massage.

9 Claims, 11 Drawing Figures

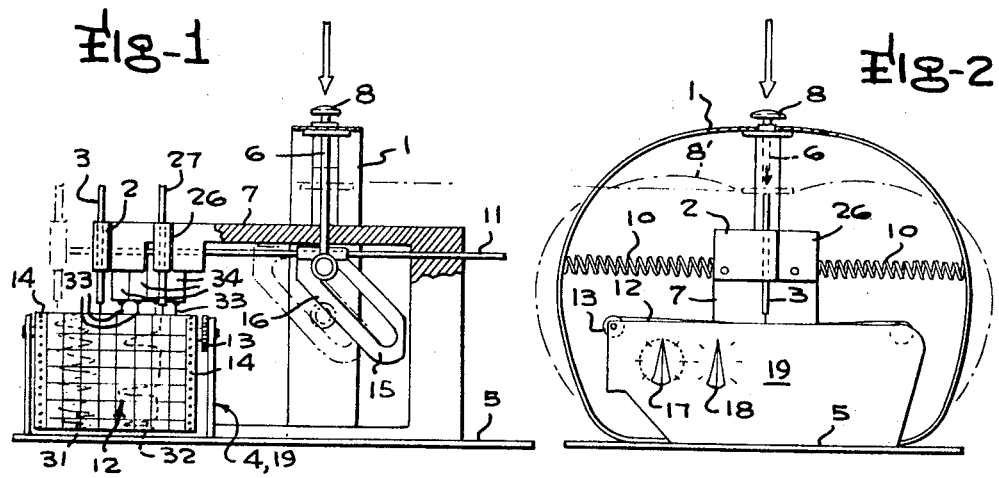
Fig-1
Fig-2
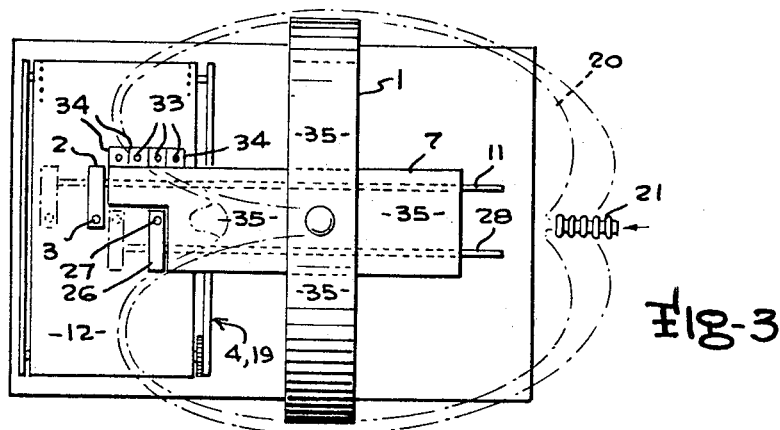
Fig-3
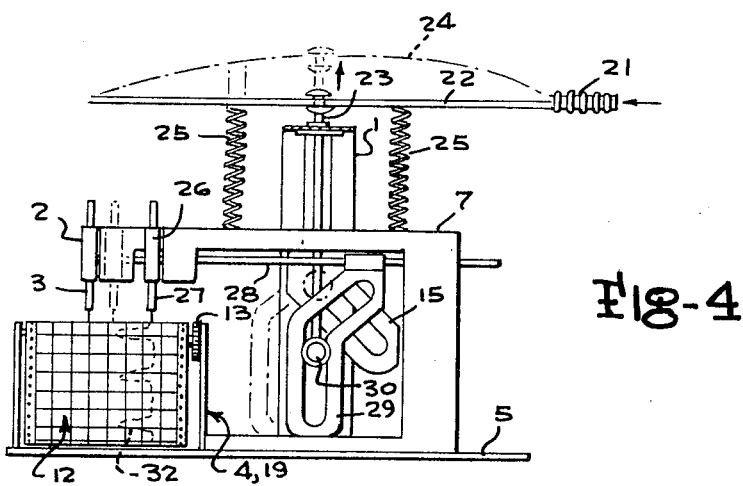
Fig-4

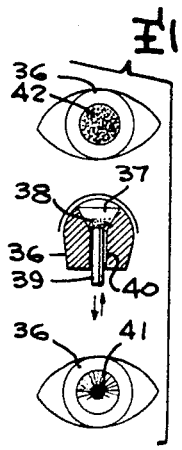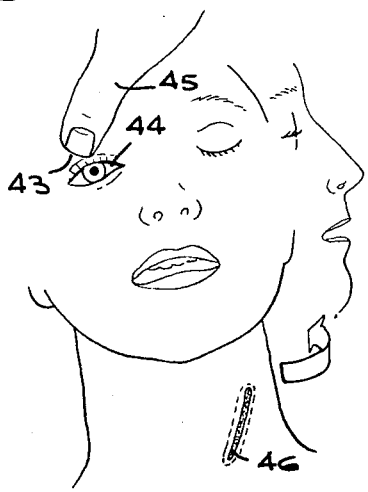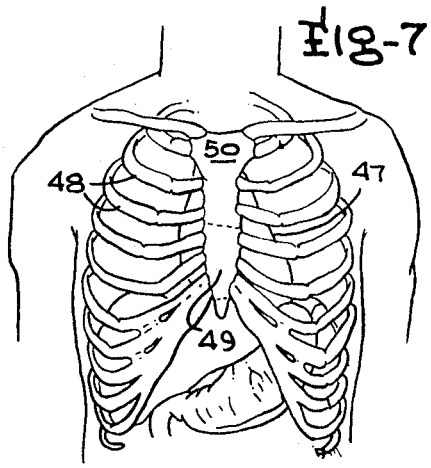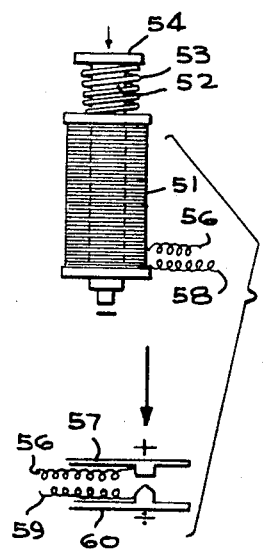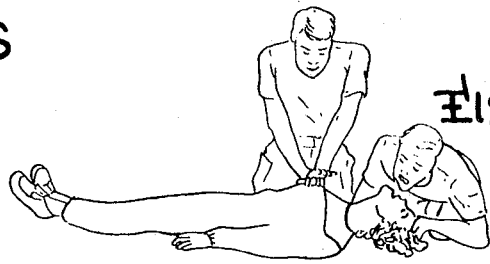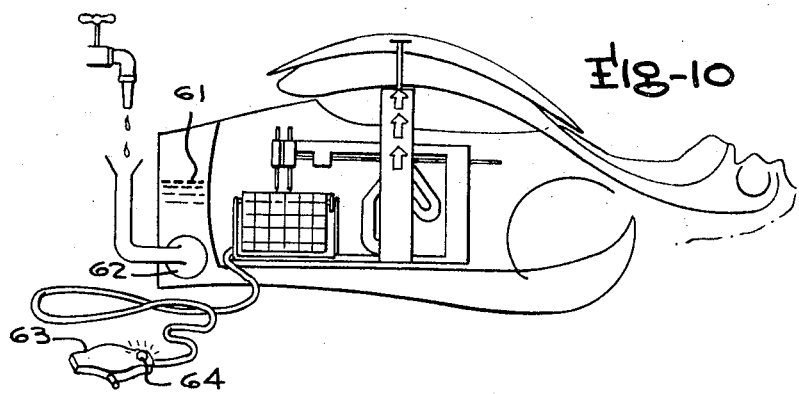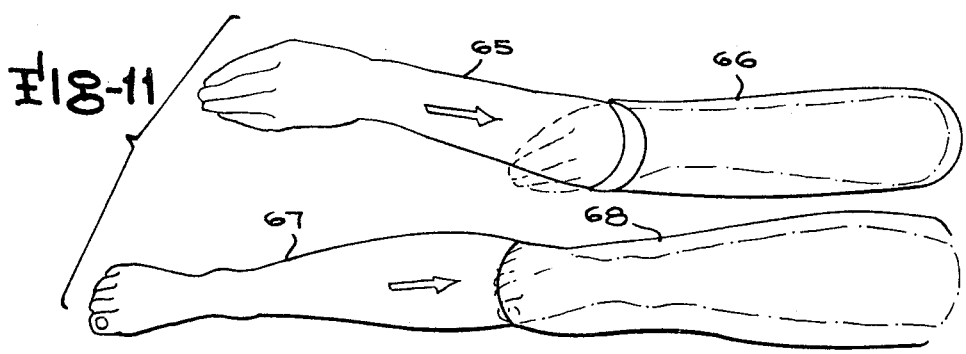

APPARATUS FOR PRACTISING RESUSCITATION BY INSUFFLATION AND EXTERNAL HEART MASSAGE

The present invention relates to an apparatus for practicing resuscitation by insufflation and external heart massage.

The main cause of death resulting from accidents or other suddenly occurring medical emergencies is stopping of breathing and of heart beat. It is, therefore, necessary to give first aid training to the greatest possible number of individuals. It is best for artificially induced breathing (mouth-to-mouth or mouth-to-nose) and massage of the heart to be applied simultaneously. This combined method of resuscitation, however, requires thorough schooling of the person rendering assistance, since performing the resuscitation successfully and without causing harm to the injured person depends on correct and synchronized insufflation and heart massage, freeing of the respiratory passages and blowing in the correct amount of air, as well as on the knowledge of the proper part of the chest and the right magnitude and direction of the pressure exerted in heart massage.

According to the present invention there is provided practicing apparatus for resuscitation by synchronized insufflation and external heart massage, such apparatus comprising a dummy torso provided with imitation respiratory organs and an imitation thorax, a recording device adapted to receive and advance a record sheet in an advancing direction, writing means adapted to write on said record sheet and means to move the writing means transverse to the advancing direction in response to movement of the imitation respiratory organs and thorax during the insufflation and heart massage.

Such an apparatus can automatically provide a written record of the exercises, which record is always available for comparison purposes and for making out certificates, and which is independent of the instructor and does not require his presence when the certificate is drawn up.

Dependent on the type of motive equipment, control of the moving means may be by electrical, hydraulic or pneumatic means, the movements caused by the resuscitation directly influencing electric potentiometers or pressure generators such as piston and cylinder arrangements or bellows. Preferably, however, the movements are mechanically transmitted to the recording device, especially when the latter is adapted to be inserted into the body of the dummy or is integrally built therein, as is preferred.

The mechanical connection between the mobile elements of the simulated thorax and the simulated lungs and the displacement drive is suitably so constructed that it is established automatically, if possible without any further manipulation.

In particular, when only one person rendering assistance practices the combined heart massage and insufflation resuscitation it is possible to transmit the signals of insufflation and of heart massage to a writing instrument associated with both processes of movement since, as a result of the necessarily separate motive pulses of insufflation and heart massage both processes can also be clearly separated in a single trace of graph on the record sheet. When two persons render assistance, one of them performing insufflation and the other heart massage, it is possible for overlapping of insufflation and heart massage compression with respect to time, which may not always be clearly separable in one trace of graph, especially with regard to their differing duration. In a preferred embodiment of the apparatus two separate writing instruments, movable independently of one another, are therefore provided, one of them being associated with the insufflation movements and the other with the movements resulting from heart compression.

It is of importance for the person or persons rendering assistance to carry out, prior to and during the resuscitation, various measures and checks which are vital in a real case. For example, the head of the dummy may be attached to the body so as to be turnable, inclinable or stretchable, in order on the one hand, by turning the head sideways to enable vomit accumulated in the respiratory tracts to flow off, and on the other hand, by inclining or pulling the head remove strangulations or constrictions of the respiratory passages. After these manipulations the spontaneous pulse of the patient may resume already after a few strokes of insufflation. For this purpose there is provided, for example at the location of the carotid artery, a corresponding imitation which the person rendering assistance may investigate by feel. Repeated feeling of the pulse should also be carried out during further progress of the resuscitation so as to recognize the amount of resumption of spontaneous heart-beat and to be able to decide whether further treatment should be given. Another sign of arrested activity of the heart, apart from a missing pulse in the great artery, is the dilation of the pupils of the eyes. Relative changes in the width of the pupils are particularly valuable indications of the effectiveness of the blood circulation caused by the heart massage. Thus the trainee should examine the condition of the pupils by opening the eye lid. Finally, the pressure of the hands performing the heart massage should not be exerted beyond a specific region of the sternum, so as to avoid fracturing of ribs and inadequate compression of the heart.

In accordance with a further particularly preferred embodiment of the invention one or more, but preferably all, of these spots of the dummy which are to be investigated by feel or which are not to be pressurized are provided with actuation devices which individually signal that the necessary manipulation has been performed or that the thorax has wrongly been pressurized beyond the region of the sternum suitable for heart compression, by means of signals to individual writing instruments provided for this purpose. These writing instruments draw the signals in the form of YES-NO statements by lateral deflection or by superposing, preferably in different colors, onto the record sheet of the recording device. The control drives and associated actuation devices for the above mentioned YES-NO signals operate preferably electrically or pneumatically or hydraulically. Mixed control systems are also conceivable.

The drive for advancing the record sheet, which sheet is suitably stored in the form of a roll and the inscribed portion of which protrudes laterally from the body of the dummy if a writing device accommodated within the body of the dummy is involved, advantageously has a synchronous motor the rate of rotation of which depends on the frequency of the electric A.C. supply grid to which the training apparatus is connected. Record sheet material having a time scale printed thereon may be used in this case. In the transverse direction of the sheet a pressure scale, a volume scale and/or a scale for the measurement of the bowing of the sternum during the simulated heart compression may be present. In this way the insufflation and heart massage induced movements can be quantitatively read in terms of time, rhythm, volume, pressure and extent of bowing of the sternum. The record sheet may, however, alternatively be advanced by a battery fed electromotor or by a windable spring mechanism. In these cases the time-constant advance of the record sheet is not ensured. A rhythmic timing device in the form of a clockwork mechanism or of an electric pulse generator is therefore associated with the writing device, the mechanism drawing a seconds scale on the record sheet by means of a writing instrument.

The invention will be better understood from the following description, of one embodiment of apparatus according to the invention, which is given, merely by way of example, reference being made to the accompanying drawings, in which:

FIG. 1 is a side elevation of the imitation thorax and of the device transmitting movements to the recording device disposed within the torso, the latter having been omitted from this Figure;

FIG. 2 is a view of the apparatus of FIG. 1 as seen in the longitudinal direction of the torso;

FIG. 3 is a plan view of the apparatus of FIG. 1, the imitation lungs being indicated;

FIG. 4 is a side view of the imitation lungs with mechanical device for moving the writing member;

FIG. 5 shows three views of a device for simulating a changeable pupil of the eye;

FIG. 6 shows the head of the dummy in two offset positions and with open eyelid;

FIG. 7 is a schematic drawing of the human thorax and of the heart contained therein;

FIG. 8 is an overall view of the dummy in position for the practice of first aid;

FIG. 9 shows an electromagnet having a spring loaded armature, and an associated switch;

FIG. 10 shows schematically a section through the thorax and head of the dummy and through the built-in recording device; and FIG. 11 shows the telescopable limbs of the dummy.

FIGS. 1 and 2 illustrate the arrangement of a steel band 1 simulating the thorax and its mechanical, motion-transmitting connection with the displacement drive 2 of a writing instrument 3 of a recording device. The steelband 1 is secured to the back support 5 of the dummy and surrounds the body space transversely of the body. A rod 6 projecting into the interior of the body, substantially perpendicular to the back support, is attached to the apex of the steelband 1. The rod 6 is axially displaceable, guided in a frame 7 and has a knob 8 situated slightly above the center of the sternum region represented in broken lines in FIGS. 1 and 2. The knob 8 serves to receive the pressure of the hand performing heart massage (see FIG. 8). The steelband 1 can be flexed, against increasing resistance, beyond the position 8' shown in broken lines in FIG. 2 and substantially corresponding to the deflection necessary for a successful heart compression. The steelband 1 is stiffened by additional spring elements 10 which can be pretensioned or replaced by springs of different characteristics, to enable the resistance to deformation to be varied for the purpose of simulating the resistance of the thorax of patients of various weights and ages.

The means 2 for moving the writing instrument or pen 3 for recording the heart compression is guided by a rod 11, substantially perpendicular to the rod 6, also longitudinally displaceable in the frame 7, and is thus in a position to perform a movement parallel to the plane of the record sheet 12, the writing tip of the pen 3 contacting the sheet 12. The sheet 12 may be advanced by a synchronous drive means 13 engaging in lateral perforations 14 of the sheet 12 by means of one or two sprockets. It is possible to ensure that the writing instruments only contact the surface of the sheet when the drive means of the sheet is operational by raising the sheet at this time.

A slotted member 15 is secured to the rod 11 and extends in the plane of movement of the rods 11 and 6 at an angle to their direction of movement. An actuating element in the form of a roll 16 secured to the rod 6 engages in the slot of the member 15. When the knob 8 and thus the rod 6 is depressed, with simultaneous deformation of the steelband 1 due to the pressure necessary for heart massage, the guide means 15 slides along the roll 16 and displaces the rod 11, and thus moves the pen 3 transverse to the direction of advance of the sheet 12. This movement proceeds as a function of the extent of depression of the rod 6 so that the lateral deflection of the pen represents a direct measure of the deformation of the steelband 1 simulating the resistance of the thorax, and thus of the heart massage pressure exerted on the knob 8. For the sake of clarity of the transmission of movements the rod 6, the roll 16, the guide means 15 and the displacement drive 2 are drawn in normal elevation in the at-rest position, while the same elements are illustrated in cross-hatched form after their displacement by a specific pressure exerted on the knob 8.

FIG. 2 indicates by means of the setting knobs 17 and 18 that the recording device is combined with a rhythmic timer 19 which may serve to apply a time scale to the record sheet and/or to simulate the reactions of the human body — heartbeat, change of width of pupils — occurring during resuscitation. The two setting knobs 17 and 18 may, for example, be provided for the purpose of selecting a specific pulse frequency and for the timing of a signal energizing an electromagnet.

By means of such a rhythmic timing device 19 a pulse of preferably variable frequency can be simulated in the imitation artery (FIG. 6) which should be investigated by feel, and in this way the trainee may learn how to feel the pulse and acquire the "feel" of pulse frequencies. After the exercise has begun success of the trainee's efforts can be simulated by delivering an artificial pulse switched on after some delay. For the same purpose the rhythmic timer may, after a specific delay, actuate a device for changing the width of the pupils (FIG. 5) of the eyes.

With a synchronized drive of the record sheet advancing device such a rhythmic timer may, of course, be driven by the sheet advancing device and vice versa. Moreover, the transmission of signals from the rhythmic timer to the pulse imitator may be by electrical, pneumatic or hydraulic means. In the first case an electromagnet having a spring loaded armature can replace the imitation artery by executing suitable knocking movements. Such an electromagnet may, however, also execute knocking pulses on a tube provided as imitation artery and filled with a pneumatic or hydraulic medium. The change in the pupils of the eyes can, for example, be simulated by an electrically released visual signal. Where a pneumatic or hydraulic transmission of signals is used, the imitation artery may be directly pressurized by the rhythmic timer via a tube connection, conforming to the rhythm of heartbeat. Production of pneumatic or of hydraulic pulses by the rhythmic timer may be effected by appropriate actuation of a valve to which a pressure accumulator or a pressure generator is connected. The pressure strokes corresponding to the rhythm of pulse frequency set at any given time can also be produced in a closed system by exertion of appropriate pressure on a deformable accumulator containing a pneumatic or hydraulic pressure medium.

The rhythmic timer may be coupled with a summation mechanism which receives the insufflations and/or particularly the heart compressions performed and adds them up over a predetermined period of time.

The summation mechanism may be mechanically connected, e.g., in the form of a gearing, to the mobile element or elements, via a latch coupling. If, within a predetermined time, the trainee achieves the specified number of heart compressions with adequate deflection of the thorax, or the specified number of insufflations with an adequate volume of air blown in, a signal is given. If the movements have been performed at too long intervals or with insufficient intensity, the signal is not given. The rhythmic timer switches on the artificial pulse or the change in the pupils as soon as the summation mechanism gives the signal indicating the successful execution of the exercise.

FIGS. 3 and 4 show the arrangement of the pouch 20 simulating the lungs. The pouch can be inflated via the line 21 communicating with the respiratory passages of the head of the dummy so as to simulate insufflation. A rod 23 is secured to the initially flat, upper wall 22 of the pouch. The rod 23 projects, substantially perpendicularly to the back support 5, into the interior of the torso and is axially displaceable, guided in the frame 7. The position assumed by the upper wall 22 of the pouch when the latter is fully inflated is shown at 24 in FIG. 4, in broken lines. The pouch expands against the resistance of its own elasticity and against the resistance of two additional spring elements 25. The pretensioning of these may be adjustable and/or the springs may be replaced by others of different characteristics, so that the resistance to inflation can be adjusted to a variety of values, especially to simulate the resistance to insufflation of constricted air passages.

The support 26 of a writing instrument 27 provided for recording the insufflation strokes has a rod 28 supported in the frame 7 so as to be displaceable in a direction perpendicular to the rod 23. A slotted guide 29 is secured to the rod 28, the lower portion of the guide extending parallel to the rod 23 and its upper region extending in the plane of movement of rods 28 and 23 and at an angle to their direction of movement. An actuation element in the form of a roll 30 is secured to the rod 23 and engages in the slot of the guide 29. When the pouch 20 is inflated its upper wall 22 rises to the position 24 taking with it the rod 23 and the roll 30, which thereby shifts the guide means 29 and the support 26 and the pen 27, transversely of the direction of advance of the sheet 12 and over the plane of writing. Here too, for the sake of clarity, the rod 23, the roll 30, the guide 29 and the support drive 26 have been drawn in normal elevation, while after inflation of the pouch 20 by the insufflation strokes the same elements arrive at the position illustrated in cross-hatched form. The traces of graph 31, for the rhythm of the heart massage, and 32, for the rhythm of insufflation, are formed in this way, these traces being shown side by side in FIG. 1. The portion of the guide 29 extending toward the rod 23 serves to prevent the compression of the imitation thorax causing a deflection of the writing instrument associated with the insufflation strokes.

Four additional writing instruments 33 can be seen in FIGS. 1 and 3 but these instruments are not displaceable across the direction of travel of the record sheet 12. These writing instruments are adapted to be applied to the writing surface of the sheet 12 by means of moving coil electromagnets 34 having spring loaded plunger type armatures. They are writing instruments for recording YES-NO signals such as serve for example for watching the position of the head, for feeling the pulse and for correct application of the hand when practicing heart massage. For the latter purpose there are provided at the locations 35 of FIG. 3, all around the application point represented by knob 8, not shown contacts which switch on one of the writing instruments 33 as a signal for wrong application of the hand or exertion of the wrong pressure when pressure is exerted at these points 35.

FIG. 5 shows the imitation of an eye 36 having a funnel-like narrowing cavity 37 containing a granular material 38. As is shown by the cross-sectional illustration of the eye, a pin 39 is situated at the bottom of the funnel 37 which pin is adapted to be moved upwards or downwards as indicated by the two arrows. In the position illustrated the pin 39 terminates at the bottom of the funnel 37 so that the granular material or powder 38 fills the lower part of the funnel 37. When the pin 39 descends the material 38 flows into the pin shaft 40 underneath the funnel so that from the direction of the wider portion of the funnel, and thus looking at the eye, one sees only a small surface 41 of material. When, on the other hand, the pin is introduced into the funnel space it displaces some of the material 38 so that the latter rises in the funnel and forms a larger surface 42 visible from the outside. This arrangement which is used to simulate changes of the pupil of the eye is illustrated at its extreme forms in FIG. 5, as a large pupil above the cross-sectional representation and as a small pupil below the cross-sectional representation.

In the illustrated embodiment of the apparatus the movement of the pin is actuated by an electromagnetic drive, e.g., a spring loaded moving coil magnet as shown in FIG. 9 yet to be discussed.

The pin could, of course, also be moved by means of a pneumatic or hydraulic arrangement, e.g., a piston and cylinder arrangement, if the rhythmic timer is constructed so as to provide the corresponding signals, i.e., when it produces signals in the form of pressure impulses or triggers off such signals by means of suitable valve movements. Another possibility of altering the visible surface of a material contained in the funnel is for the material to consist of resiliently compressible flakes to which iron particles are attached. The pin then serves as the stationary core of an electromagnet. When this is energized the flaky material compresses toward the magnet and forms a smaller visible surface in the funnel. When the electromagnet is de-energized the material expands as a result of the resilience of the flakes and spreads out in the wider portion of the funnel, thus forming a larger surface. The simulated changes of pupils here described can advantageously be controlled substantially continuously.

The head of the dummy illustrated in FIG. 6 is adapted to be turned relative to the body (removal of a secretion obstructing the respiratory tract) or to be stretched backwards (freeing of the respiratory passages). Since these head movements are a necessary part of the exercise they are transmitted for recording purposes to writing instruments 33 provided for this purpose, by means of contacts (not shown) arranged at suitable points of the head-neck connection, e.g., between two mutually rotatable discs for observing the turning movement of the head. Other contacts may be provided for observing inclination of the head or downward pulling of the jaw. In order to watch whether the trainee opens the lid of the eye a further contact (not shown) is provided at the point of application 43 of the thumb 45 opening the eyelid 44, and a writing instrument is associated with this contact. Approximately where the carotid artery is situated there is an imitation artery 46 the investigation by feel of which is likewise watched by a further contact (not shown) associated with a writing instrument. An artificial heart beat may also be produced in this imitation artery by a rhythmic timer in the manner described above.

FIG. 7 shows diagrammatically the position of the heart 47 within the human thorax 48. The most effective heart compression coincident with the least risk of fracture of ribs is achieved by pressure on the shaded region 49 of the sternum 50. FIG. 8 shows two trainees practicing the combined insufflation and heart massage technique on a dummy. The head of the dummy has been stretched backward so as to free the respiratory passages; the correct positioning of the hand on the lower region of the sternum can be seen.

FIG. 9 shows an electromagnet in the form of a moving coil 51 having a spring loaded plunger type armature 52, i.e., an electromagnet such as can be used for actuating the writing instruments 33, the pupil of the eye and for producing an artificial pulse in the imitation artery. The return spring 53 is a helical compression spring disposed between an enlargement 54 at one end of the plunger type armature 52 and the adjoining face of the coil. The spring ensures that the armature projects only slightly into the coil when the current to the coil is switched off. A narrower and/or non-magnetic attachment 55 at the upper end of the armature symbolically represents a writing instrument 33, the pin 39 or a similar element. One end 56 of the winding of the coil 51 is connected to one leaf spring 57 of a contact and the other end 58 of the winding is connected to one pole of a source of electric energy (not shown), a wire 59 connecting the other pole to the other leaf spring 60 of the contact. When the contact 57, 60 is closed by the exertion of pressure in the direction of the arrow, current flows through the coil, the resulting magnetic field attracting the armature 52 into the interior of the coil, counter to the force of the spring. The attachment 55 arranged at the armature is thereby moved farther out of the coil 51. When, because the pressure is lifted and the leaf springs 57, 60 resiliently separate, the flow of current is interrupted, the magnetic field collapses and the helical spring 53 returns the plunger type armature to the original position illustrated.

FIG. 10 shows a schematic cross-section through the body of the dummy, the recording equipment described with reference to FIGS. 1 to 4 being contained in the inner chamber of the body. An empty space 61 remains between the boundaries of the inner chamber and the outer wall of the body, an opening 62 giving access to the space 61. By filling this space with a pourable or flowable material such as water in this example, the dummy can be given a weight comparable to that of a human body so that manipulation of the dummy corresponds to conditions existing in reality. Conveniently the water is removed for transport and storage of the dummy.

Since the body of the dummy may be covered by clothing a means of switching the recording device on and off, such as a switch 63 on a cable as here illustrated, is suitably provided exteriorly of the dummy. A bulb 64 for signalling readiness for use is associated with the switch and likewise unobstructed by clothing, so as to be readily visible.

With a view to realistic handling and so as to adapt the outer dimensions of the dummy to those of the human body, arms and legs are fitted to the torso of the dummy. Since, however, saving space is of importance when the dummy is being transported or stored, the lower portions of the arms are adapted to be telescoped into the upper arms and the shinbone portions into the thighs, as shown in FIG. 11. In order to preclude damage and lasting deformation while in storage, the walls of the hollow limb portions are made of a resiliently deformable-sponge-like material.

I claim:

1. Practicing apparatus for resuscitation by synchronized insufflation and external heart massage, said apparatus comprising in combination:
   a. a dummy torso;
   b. imitation respiratory organs associated with said torso;
   c. an imitation thorax associated with said torso;
   d. a recording device adapted to receive and advance a record sheet in an advancing direction at substantially constant speed;
   e. writing means adapted to write on said record sheet comprising first and second independent writing instruments operable independently of each other; and
   f. first linkage means connecting said first writing instrument to said imitation respiratory organs to move said first writing instrument transverse to said advancing direction in response to movement of said imitation respiratory organs and second linkage means connecting said second writing instrument to said imitation thorax to move said second writing instrument transverse to said advancing direction in response to movement of said imitation thorax during insufflation and heart massage.

2. Practicing apparatus as claimed in claim 1, wherein said first and second linkage means effective to move said writing instruments each includes a mechanical coupling disposed within said dummy torso and directly executing substantially vertically directed movements occurring in the torso during insufflation and heart massage.

3. Practicing apparatus as claimed in claim 1, wherein said dummy further includes means simulating the neck region, the area surrounding the correct point of hand application when performing heart massage, a region of pulse simulation and the region where the eyelid is situated, an actuating device associated with each said simulating means, and a writing member associated with each actuating device, effective to indicate on said record sheet whether said actuating device has been correctly actuated.

4. Practicing apparatus as claimed in claim 1, and further including a rhythmic timer by means of which the reaction of the human body to resuscitation can be simulated in the manner of a predetermined variable settable program.

5. Practicing apparatus as claimed in claim 1, and further including a hollow space in said dummy torso, a closable opening through which said hollow space can be filled with a flowable material to simulate the weight of the human body, and dummy limbs attached to the torso.

6. Practicing apparatus as claimed in claim 1, wherein said imitation thorax includes a back portion of the dummy torso, a resilient element secured to said back portion and extending transversely of the torso approximately at the lower half of the sternum, and wherein said second linkage means to move said second writing instrument includes a rod connected to said resilient member for movement therewith, means for guiding the rod in the direction of heart massage pressure substantially perpendicular to said back portion said rod being connected to said resilient member for movement therewith.

7. Apparatus as claimed in claim 6, and additionally including resilient spring elements associated with said resilient member, effective to adjust the deformable characteristics thereof.

8. Practicing apparatus as claimed in claim 1, wherein said imitation respiratory organs include an inflatable pouch, two walls to said inflatable pouch, and said first linkage means includes a rod secured to one of said walls for movement therewith upon inflation of said pouch, said rod being connected to said first writing instrument.

9. Practicing apparatus as claimed in claim 8 and further including resilient means connected to said one wall of said pouch effective to resist inflation thereof.

* * * * *